United States Patent
Arimura et al.

(10) Patent No.: US 10,673,308 B2
(45) Date of Patent: Jun. 2, 2020

(54) DRIVE MOTOR, ELECTRIC VEHICLE, AND DRIVE MOTOR CONTROL METHOD

(71) Applicant: HONDA MOTOR CO., LTD., Minato-ku, Tokyo (JP)

(72) Inventors: Yutaka Arimura, Wako (JP); Daisuke Hoshino, Wako (JP); Tatsuya Ohzu, Wako (JP); Shingo Soma, Wako (JP); Yosuke Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/285,901

(22) Filed: Feb. 26, 2019

(65) Prior Publication Data

US 2019/0267870 A1 Aug. 29, 2019

(30) Foreign Application Priority Data

Feb. 27, 2018 (JP) ................................. 2018-032676

(51) Int. Cl.
| | |
|---|---|
| H02K 11/24 | (2016.01) |
| H02K 1/28 | (2006.01) |
| H02K 7/108 | (2006.01) |
| B60W 10/08 | (2006.01) |
| H02K 11/21 | (2016.01) |
| H02P 23/14 | (2006.01) |
| H02K 11/33 | (2016.01) |
| H02K 7/116 | (2006.01) |
| H02K 7/00 | (2006.01) |
| H02K 11/20 | (2016.01) |

(52) U.S. Cl.
CPC ............. *H02K 11/24* (2016.01); *B60W 10/08* (2013.01); *H02K 1/28* (2013.01); *H02K 7/006* (2013.01); *H02K 7/1085* (2013.01); *H02K 7/116* (2013.01); *H02K 11/20* (2016.01); *H02K 11/21* (2016.01); *H02K 11/33* (2016.01); *H02P 23/14* (2013.01)

(58) Field of Classification Search
USPC ................................................. 318/139, 432
See application file for complete search history.

(56) References Cited

U.S. PATENT DOCUMENTS

| | | | |
|---|---|---|---|
| 2010/0263962 A1* | 10/2010 | Shimizu | B62D 5/04 180/446 |
| 2012/0018241 A1* | 1/2012 | Shimizu | B62D 6/10 180/443 |
| 2017/0158043 A1 | 6/2017 | Tsukamoto | |

FOREIGN PATENT DOCUMENTS

| | | |
|---|---|---|
| JP | 2000-324607 A | 11/2000 |
| JP | 2005-045916 A | 2/2005 |
| JP | 2008-070379 A | 3/2008 |
| JP | 2017-100590 A | 6/2017 |

OTHER PUBLICATIONS

Office Action dated Nov. 12, 2019 issued over the corresponding Japanese Patent Application No. 2018-032676 with the English translation thereof.

* cited by examiner

*Primary Examiner* — Bentsu Ro
(74) *Attorney, Agent, or Firm* — Carrier Blackman & Associates, P.C.; Joseph P. Carrier; William D. Blackman

(57) ABSTRACT

A drive motor in which a torque sensor is arranged on an outer circumference of a shaft, includes a rotor, a rotor shaft arranged inside the rotor, and an output shaft that is joined to the rotor shaft by a spline joint and outputs rotational force of the rotor shaft to the output side. The torque sensor is arranged on an output side of the spline joint in a range not overlapping with the spline joint.

11 Claims, 7 Drawing Sheets

DRIVE MOTOR, ELECTRIC VEHICLE, AND DRIVE MOTOR CONTROL METHOD

CROSS-REFERENCE TO RELATED APPLICATION

This application is based upon and claims the benefit of priority from Japanese Patent Application No. 2018-032676 filed on Feb. 27, 2018, the contents of which are incorporated herein by reference.

BACKGROUND OF THE INVENTION

Field of the Invention

The present invention relates to a drive motor that drives a wheel, for example, an electric vehicle including the drive motor, and a drive motor control method.

Description of the Related Art

The following is disclosed in Japanese Laid-Open Patent Publication No. 2000-324607. "When a torque sensor is used on the downstream side of a motor, the motor control means is preferably a means that controls driving feedback of the motor based on a difference between the torque detected by the torque sensor and the torque corresponding to the target rotational state. If this is the case, it is possible to match the torque output from the drive shaft to a target torque more suitably."

SUMMARY OF THE INVENTION

It should be noted that the drive motor that drives the wheels includes at least a rotor, a rotor shaft arranged inside this rotor, and an output shaft that is joined to the rotor shaft by a spline joint and transmits the rotational force of the rotor shaft to the output side. In other words, the rotor shaft and the output shaft are joined to each other via a spline joint.

Usually, since a spline joint has a loose element, when the vehicle begins moving or the drive force is increased from a state where the drive motor is generating almost no drive force, for example, so-called torque loss occurs, and there is a concern that the output shaft will rotate suddenly and cause a shock that is propagated to the outside as noise and vibration.

The present invention takes the above problems into consideration, and it is an objective of the present invention to provide a drive motor and a drive motor control method that make it possible to restrict sudden rotation of the output shaft based on the loose element of the spline joint.

Further, it is another objective of the present invention to provide an electric vehicle that makes it possible to restrict propagation of vibrations and abnormal sounds (noises) to the outside and also to reduce the feeling of discomfort felt by the driver.

A first aspect of the present invention is a drive motor in which a magnetostrictive torque sensor is arranged on an outer circumference of a shaft, the drive motor including a rotor; a rotor shaft arranged within the rotor; and an output shaft that is joined to the rotor shaft by a joint having a loose element, and is configured to transmit rotational force of the rotor shaft to an output side, wherein the magnetostrictive torque sensor is arranged on an output side of the joint, in a range not overlapping with the joint.

A second aspect of the present invention is an electric vehicle including the drive motor according to the first aspect described above.

A third aspect of the present invention is a control method of the above drive motor, including a step of determining whether a torque command value from a motor control section configured to control the drive motor is greater than or equal to a prescribed value; a step of determining whether actual torque from the torque sensor is at a minimum, if the torque command value is greater than or equal to the prescribed value; and a step of lowering the torque command value if the actual torque is at the minimum.

A fourth aspect of the present invention is a control method of the above drive motor, including a step of determining whether a torque command value from a motor control section configured to control the drive motor is greater than or equal to a prescribed value; a step of determining whether actual torque from the torque sensor is at a minimum; and a step of outputting the torque command value without lowering the torque command value, if the torque command value is less than the prescribed value or if it is determined that the actual torque from the torque sensor is not at the minimum.

According to the present invention, it is possible to restrict sudden rotation of the output shaft based on the loose element of the spline joint. Furthermore, according to the present invention, it is possible to restrict propagation of vibrations and noises to the outside, and to reduce the feeling of discomfort felt by the driver.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The following describes preferred embodiments of a drive motor, an electric vehicle, and a drive motor control method according to the present invention, while referencing FIGS. 1 to 7.

A. Present Embodiment

<A-1. Configuration of the Present Embodiment>
[A-1-1. Overall Configuration]

Figure 1:
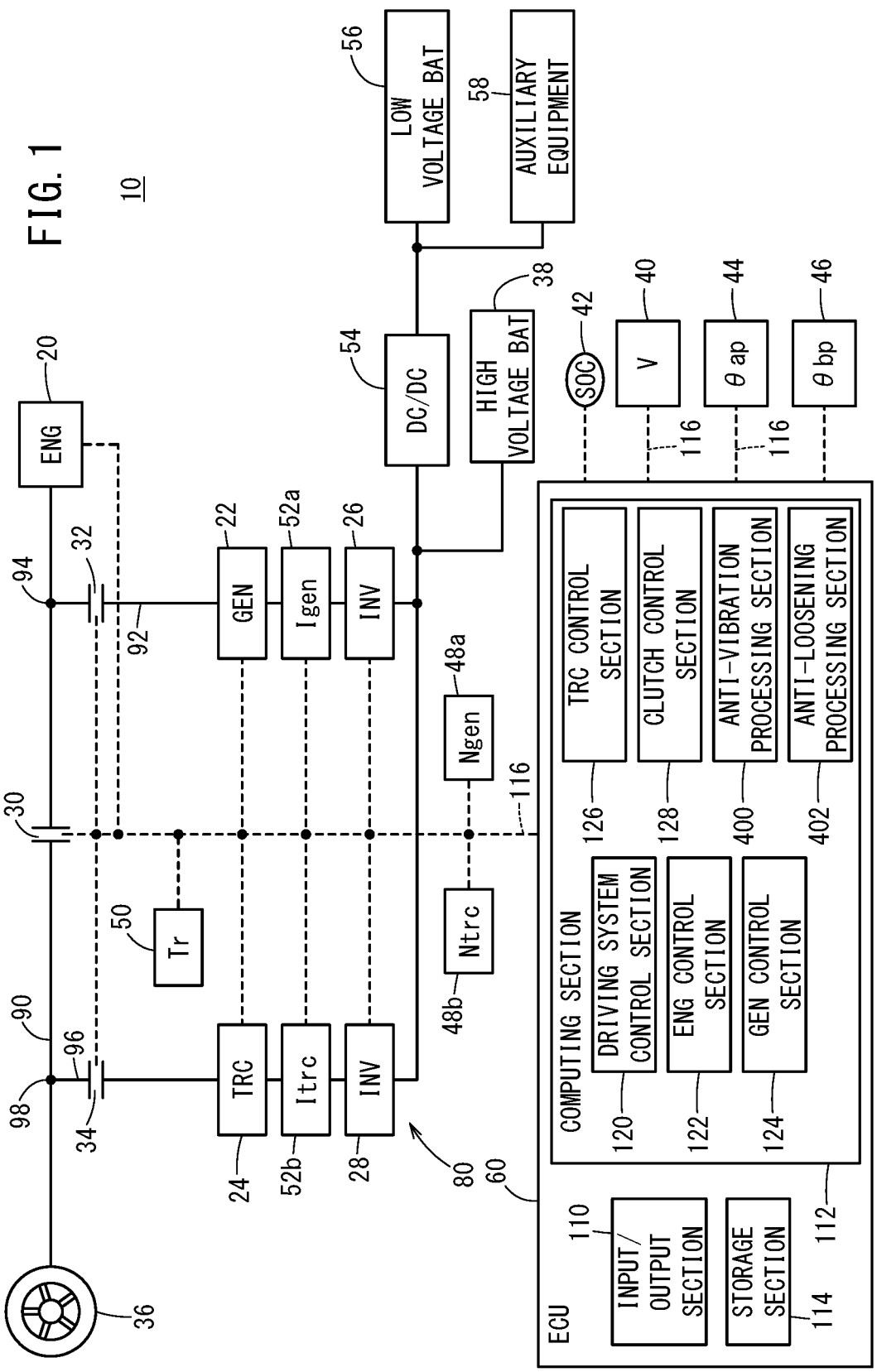
FIG. 1 is a schematic configurational view of the electric vehicle according to the present embodiment.

FIG. 1 is a schematic configurational view of an electric vehicle 10 according to the present embodiment. The electric vehicle 10 is a so-called hybrid vehicle. The electric vehicle 10 includes an engine 20, a first rotating electric machine 22 (GEN), a second rotating electric machine 24 (TRC), a first inverter 26, a second inverter 28, a first clutch 30, a second clutch 32, a third clutch 34, a wheel 36, a high voltage battery 38, a vehicle velocity sensor 40, an SOC sensor 42, an AP manipulation amount sensor 44, a BP manipulation amount sensor 46, rotational velocity sensors 48a and 48b, a magnetostrictive torque sensor 50 (referred to below simply as a torque sensor 50), current sensors 52a and 52b, a step-down converter 54, a low voltage battery 56, electric auxiliary equipment 58, and an electronic control unit 60 (referred to below as an "ECU 60").

Below, the engine 20, the first rotating electric machine 22, the second rotating electric machine 24, the first clutch 30, the second clutch 32, and the third clutch 34 are referred to collectively as a drive system 80. This drive system 80 is provided for each wheel 36, e.g., four drive systems 80 are provided if there are four wheels, and two drive systems 80 are provided if there are two wheels. It should be noted that two wheels 36 may be linked via a differential apparatus (not shown in the drawings).

Furthermore, the force transmission path connecting the engine 20 and the wheel 36 is referred to as a first transmission path 90. The first transmission path 90 transmits the force Feng generated by the engine 20 to the wheel 36. Furthermore, a force transmission path that connects the first rotating electric machine 22 and a first branch point 94, which is on the engine 20 side of the first clutch 30 in the first transmission path 90, is referred to as the second transmission path 92. Yet further, a force transmission path connecting the second rotating electric machine 24 and a second branch point 98, which is on the wheel 36 side of the first clutch 30 in the first transmission path 90, is referred to as a third transmission path 96.

[A-1-2. Drive System 80]

Figure 2:
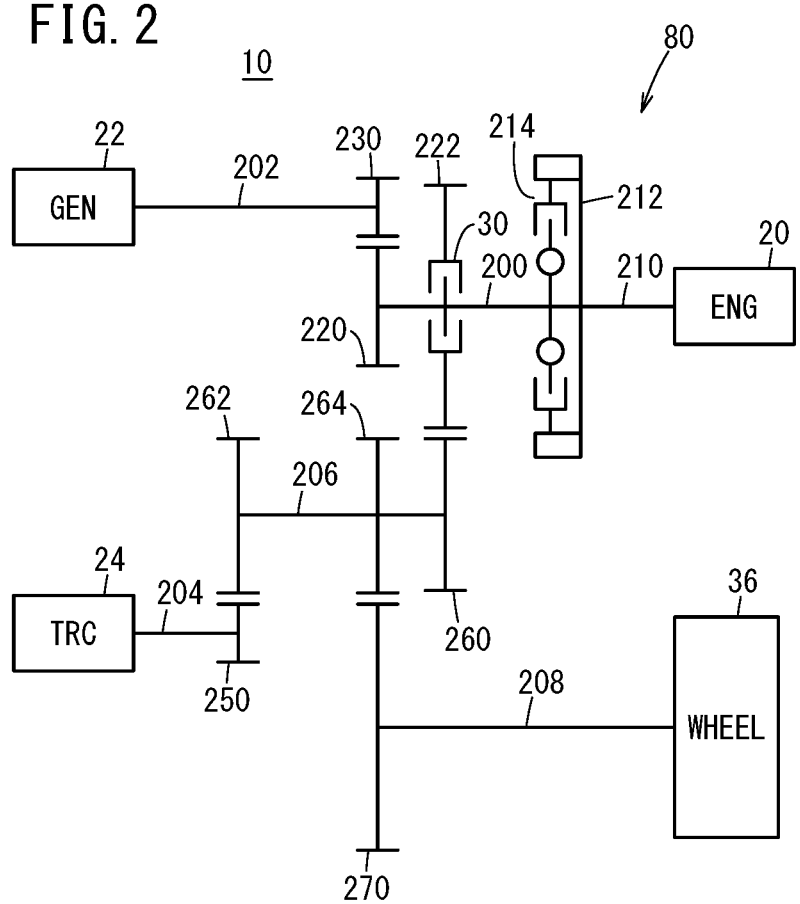
FIG. 2 is a simplified view of the mechanical connection relationships in the drive system of the electric vehicle.

As shown in FIG. 2, the drive system 80 includes an engine shaft 200, a generator shaft 202, a motor shaft 204, a counter shaft 206, and a wheel output shaft 208. The engine 20 is connected to the engine shaft 200, via a crank shaft 210, a drive plate 212, and a damper 214. The first clutch 30 (engine clutch), a first engine shaft gear 220, and a second engine shaft gear 222 are arranged on the engine shaft 200.

The generator shaft 202 includes a generator shaft gear 230 that engages with the first engine shaft gear 220 of the engine shaft 200. The motor shaft 204 includes a motor shaft gear 250 that engages with a second counter shaft gear 262 of the counter shaft 206. The counter shaft 206 includes a first counter shaft gear 260, the second counter shaft gear 262, and a third counter shaft gear 264.

The first counter shaft gear 260 engages with the second engine shaft gear 222 of the engine shaft 200. The second counter shaft gear 262 engages with the motor shaft gear 250 of the motor shaft 204. The third counter shaft gear 264 engages with an output shaft gear 270 of the wheel output shaft 208. A differential apparatus, not shown in the drawings, is provided to the wheel output shaft 208. Each shaft 200, 202, 204, 206, and 208 is a torque transmission shaft that transmits torque to the wheel 36.

When the engine 20 operates while the first clutch 30 is in a disconnected state, the first rotating electric machine 22 generates electric power due to the engine torque Teng. When the engine 20 operates while the first clutch 30 is in a connected state, the engine torque Teng is transmitted to the wheel 36 via the engine shaft 200, the counter shaft 206, and the wheel output shaft 208. When the first clutch 30 is in the connected state, the first rotating electric machine 22 may generate electric power due to the engine torque Teng, or the first rotating electric machine 22 itself may generate torque Teng for driving the vehicle.

When the second rotating electric machine 24 operates while the first clutch 30 is in the disconnected state, motor torque Ttrc is transmitted to the wheel 36 via the motor shaft 204, the counter shaft 206, and the wheel output shaft 208. When the vehicle 10 decelerates, regeneration torque Treg is input to the traction motor 24 through the opposite path, so that the second rotating electric machine 24 regenerates. Furthermore, when the engine 20 and the second rotating electric machine 24 operate while the first clutch 30 is in the connected state, the engine torque Teng and the motor torque Ttrc are transmitted to the wheel 36.

The configuration of the drive system 80 is not limited to the configuration shown in FIG. 2. For example, a configuration similar to the configuration described in Japanese Laid-Open Patent Publication No. 2017-100590, for example, may be used for the drive system 80 (see FIG. 2, for example, in Japanese Laid-Open Patent Publication No. 2017-100590).

[A-1-3. Engine 20]

The engine 20 generates the force Feng as a first drive source for travel of the vehicle 10, and supplies this force Feng to the wheel 36 (driving wheel). Furthermore, the engine 20 generates electric power by operating the first rotating electric machine 22 with the force Feng. Below, "ENG" or "eng" is appended to parameters relating to the engine 20. In FIG. 1 and the like, the engine 20 is indicated by "ENG".

[A-1-4. First Rotating Electric Machine 22]

The first rotating electric machine 22 is a three-phase AC (alternating-current) brushless type, and functions as a generator that generates electric power with the force Feng from the engine 20. The electric power Pgen generated by the first rotating electric machine 22 is supplied via the first inverter 26 to the high voltage battery 38 (referred to below as the "battery 38") or the second rotating electric machine 24, or to the electric auxiliary equipment 58. The first rotating electric machine 22 is an interior permanent magnet synchronous motor (IPMSM). The first rotating electric machine 22 includes a stator and a rotor, not shown in the drawings.

Below, the first rotating electric machine 22 is also referred to as a generator 22. The first rotating electric machine 22 may function as a traction motor, in addition to or instead of functioning as a generator. Below, "GEN" or "gen" is appended to parameters relating to the generator 22.

Furthermore, in FIG. 1 and the like, the generator 22 is indicated by "GEN". The generator 22 can be used as the stator motor of the engine 20.

[A-1-5. Second Rotating Electric Machine 24]

The second rotating electric machine 24 is a three-phase AC brushless type that generates a force Ftrc serving as a second drive source for travel of the electric vehicle 10 and supplies this force Ftrc to the wheel 36 (driving wheel) side. In other words, the second rotating electric machine 24 functions as a traction motor that is driven by one or both of the power Pbat from the high voltage battery 38 and the power Pgen from the generator 22. Furthermore, the second rotating electric machine 24 performs regeneration when the electric vehicle 10 brakes, and supplies the battery 38 with regeneration power Preg via a second invertor, not shown in the drawings. The regeneration power Preg may be supplied to the electric auxiliary equipment 58 (also referred to below as "auxiliary equipment 58"). In the same manner as the generator 22, the second rotating electric machine 24 is an interior permanent magnet synchronous motor (IPMSM). The second rotating electric machine 24 includes a stator and a rotor, not shown in the drawings. Below, the second rotating electric machine 24 is also referred to as a traction motor 24 or TRC motor 24.

The second rotating electric machine 24 may function as a generator, in addition to or instead of functioning as a traction motor. Below, "TRC" or "trc" is appended to parameters relating to the traction motor 24. Furthermore, in FIG. 1 and the like, the traction motor 24 is indicated by "TRC".

Figure 3:
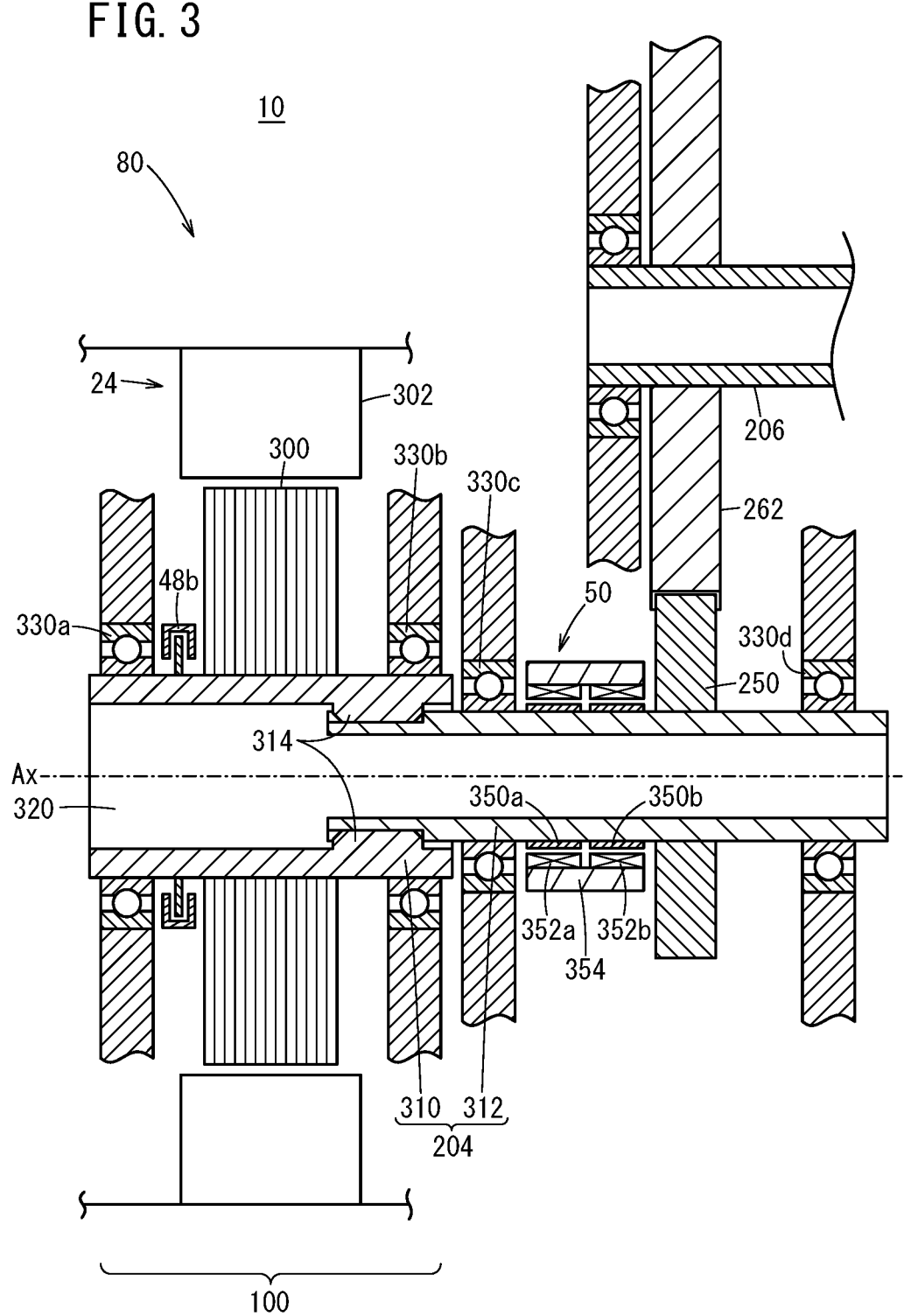
FIG. 3 is a cross sectional view showing an arrangement example of the torque sensor in the drive motor according to the present embodiment.

As shown in FIG. 3, the traction motor 24 includes the drive motor 100. This drive motor 100 includes a rotor 300 and a stator 302, in addition to the motor shaft 204. The rotor 300 rotates centered on a rotational axis Ax. The motor shaft 204 includes a rotor shaft 310 arranged inside the rotor 300 and an output shaft 312 joined to the rotor shaft 310. The output shaft 312 is joined to the rotor shaft 310 by a spline joint 314. The joining of the rotor shaft 310 and the output shaft 312 can be achieved by coupling or a joint structure, for example, instead of the spline joint 314. A drive motor similar to the drive motor 100 may also be included in the first rotating electric machine 22.

The motor shaft 204 is composed of a magnetic body. The magnetic body is carbon steel or alloy steel (chromium steel, chromium molybdenum steel, or the like), for example. The motor shaft 204 is rotatably be supported by a first bearing 330a, a second bearing 330b, a third bearing 330c, and a fourth bearing 330d. In other words, the rotor shaft 310 is rotatably supported by the first bearing 330a and the second bearing 330b, which are respectively arranged at both end portions of the rotor shaft 310, and the output shaft 312 is rotatably supported by the third bearing 330c and the fourth bearing 330d respectively arranged at both end portions of the output shaft 312. The third bearing 330c is disposed at one of the end portions that is closer to the spline joint 314.

[A-1-6. First Inverter 26 and Second Inverter 28]

The first inverter 26 and the second inverter 28 have three-phase full bridge configurations, and perform DC/AC conversion. In other words, the first inverter 26 and the second inverter 28 convert the direct current from the high voltage battery 38 into three-phase alternating current, and supply the three-phase alternating current to the first rotating electric machine 22 and the second rotating electric machine 24. Furthermore, the first inverter 26 and the second inverter 28 supply the battery 38 with the direct current resulting from the AC/DC conversion performed on the alternating current accompanying the power generation operation (or regeneration operation) of the first rotating electric machine 22 and the second rotating electric machine 24.

[A-1-7. First Clutch 30, Second Clutch 32, and Third Clutch 34]

The first clutch 30 (first switching apparatus) is arranged in the first transmission path 90, and switches between a connected state and a disconnected state between the engine 20 and the wheel 36, based on instructions from the ECU 60.

The second clutch 32 (second switching apparatus) is arranged in the second transmission path 92, and switches between a connected state and a disconnected state between the first transmission path 90 and the generator 22, based on instructions from the ECU 60.

The third clutch 34 (third switching apparatus) is arranged in the third transmission path 96, and switches between a connected state and a disconnected state between the first transmission path 90 and the traction motor 24, based on instructions from the ECU 60.

[A-1-8. High Voltage Battery 38]

The high voltage battery 38 is a power storage apparatus (energy storage) that includes a plurality of battery cells and is capable of outputting a high voltage (hundreds of volts), and can be a lithium ion secondary battery, a nickel hydrogen secondary battery, an all solid state battery, or the like, for example. A power storage device such as a capacitor can also be used, instead of or in addition to the battery 38.

[A-1-9. Various Sensors]

The vehicle velocity sensor 40 detects the vehicle velocity V [km/h] of the vehicle 10, and transmits this vehicle velocity to the ECU 60. The SOC sensor 42 is formed by a current sensor or the like, not shown in the drawings, detects the state of charge (SOC) of the battery 38, and transmits this SOC to the ECU 60.

The AP manipulation amount sensor 44 detects the depression amount (AP manipulation amount θap) [deg] or [%] of an acceleration pedal, not shown in the drawings, from an original position, and transmits this depression amount to the ECU 60. The BP manipulation amount sensor 46 detects the depression amount (BP manipulation amount θbp) [deg] or [%] of a brake pedal, not shown in the drawings, from an original position, and transmits this depression amount to the ECU 60.

The first rotational velocity sensor 48a is formed by a resolver, for example, detects the rotational velocity Ngen [rpm] of the generator 22 as a number of rotations per unit time, and transmits this rotational velocity Ngen to the ECU 60. The rotational velocity sensor 48b is formed by a resolver, for example, detects the actual rotational velocity Ntrc [rpm] of the traction motor 24 as a number of rotations per unit time, and transmits this actual rotational velocity Ntrc to the ECU 60.

As shown in FIG. 3, the rotational velocity sensor 48b is arranged near one end on a side of the rotor shaft 310 that protrudes from the rotor 300 and is opposite the output shaft 312 side, i.e., the rotational velocity sensor 48b is arranged near one side that is not a torque transmission path. Specifically, the rotational velocity sensor 48b is arranged between the first bearing 330a and the rotor 300 on the rotor shaft 310. This configuration is the same for the first rotational velocity sensor 48a as well.

The current sensor 52a detects the current Igen flowing between the generator 22 and the first inverter 26. The current sensor 52b detects the current Itrc flowing between the traction motor 24 and the second inverter 28.

[A-1-10. Step-Down Converter 54, Low Voltage Battery 56, and Electric Auxiliary Equipment 58]

The step-down converter 54 steps down the battery voltage Vbat, the power generation voltage Vgen, or the regeneration voltage Vreg, and supplies this voltage to the electric auxiliary equipment 58. The battery voltage Vbat is the output voltage of the battery 38, the power generation voltage Vgen is the output voltage of the generator 22 when generating electric power, and the regeneration voltage Vreg is the output voltage of the traction motor 24 during regeneration. The auxiliary equipment 58 includes lights, air conditioning equipment, a navigation apparatus, an audio apparatus, and the like, for example.

[A-1-11. ECU 60]

The ECU 60 is a control apparatus (or control circuit) that controls the entire drive system 80, and includes an input/output section 110, a computing section 112, and a storage section 114. The input/output section 110 performs input and output of signals with each section of the vehicle 10, via signal lines 116 (communication lines). The input/output section 110 includes an A/D conversion circuit, not shown in the drawings, that converts analog signals input thereto into digital signals.

The computing section 112 includes a central processing unit (CPU) and operates according the execution of a program stored in the storage section 114. A portion of the functions performed by the computing section 112 can be realized using a logic IC (Integrated Circuit). The program may be supplied from the outside, via a wireless communication apparatus (mobile telephone, smart phone, or the like), not shown in the drawings. The computing section 112 can configure a portion of the program with hardware (circuit components).

As shown in FIG. 1, the computing section 112 includes a driving system control section 120, an engine control section 122 (ENG control section), a generator control section 124 (GEN control section), a traction motor control section 126 (TRC control section), and a clutch control section 128.

The driving system control section 120 controls driving systems of the vehicle 10. Here, the driving systems include a driving system using the engine 20, a driving system using the traction motor 24, and a driving system using the engine 20 and the traction motor 24.

The engine control section 122 controls the engine 20 based on instructions from the driving system control section 120. The generator control section 124 (also referred to below as the "GEN control section 124") controls the generator 22 based on instructions from the driving system control section 120.

The traction motor control section 126 controls the traction motor 24 based on instructions from the driving system control section 120. The clutch control section 128 controls the first to third clutches 30, 32, and 34 based on instructions from the driving system control section 120.

The storage section 114 stores programs and data used by the computing section 112, and includes a random access memory (RAM). A volatile memory such as a register and a non-volatile memory such as a flash memory can be used as the RAM. Furthermore, the storage section 114 may include a read only memory (ROM), in addition to the RAM.

<A-2. Travel Modes>

In the present embodiment, a MOT travel mode, a hybrid travel mode, an ENG travel mode, and a regeneration mode are used. The MOT travel mode is a mode in which the traction motor 24 drives the vehicle 10 mainly using the electric power of the high voltage battery 38. The hybrid travel mode is a mode in which the generator 22 generates electric power according to the torque Teng of the engine 20, and the vehicle 10 is driven by the traction motor 24 using this generated electric power. The ENG travel mode is a mode in which travel is achieved using the engine 20 as the main drive source.

The MOT travel mode, the hybrid travel mode, and the ENG travel mode are selected mainly according to the travel drive force Fd of the vehicle 10 and the vehicle velocity V. The selection of each mode can be performed according to the standards described in Japanese Laid-Open Patent Publication No. 2017-100590.

[Characteristic Configuration of the Electric Vehicle 10]

As shown in FIG. 3, the vehicle 10 has the torque sensor 50 arranged at a position near the rotor shaft 310 on the output shaft 312, e.g., between the third bearing 330c and the motor shaft gear 250, to detect the torque Tr (actual torque) occurring in the output shaft 312.

The torque sensor 50 includes a plurality of magnetostrictive layers 350a and 350b and a plurality of coils 352a and 352b. The magnetostrictive layers 350a and 350b (magnetostrictive films) are arranged on the outer circumferential surface of the output shaft 312. The magnetostrictive layers 350a and 350b are formed by plating. Alternatively, the magnetostrictive layers 350a and 350b may be formed by grooves resulting from knurling, magnetostrictive metal films affixed with an adhesive, or a press-fitted annular magnetostrictive metal member. On the other hand, the coils 352a and 352b are arranged inside a cylinder 354 secured to a support member, not shown in the drawings.

As described above, when arranging the torque sensor 50, the rotor 300, the third bearing 330c, and the torque sensor 50 are preferably arranged in the stated order from the rotor 300 toward the output side. For example, when directly attaching the wheel 36 to the output shaft 312, there is an advantage that the torque sensor 50 can be easily arranged. Furthermore, since the third bearing 330c realizes the role of a magnetic shield for the magnetism generated from the rotor 300 and the like, it is possible to restrict the effect of magnetism on the torque sensor 50.

The torque sensor 50 may be arranged at a position corresponding to the spline joint 314, but the torque sensor 50 undesirably detects the stress occurring in the spline joint 314 in this case, and so this arrangement is not preferable in terms of increasing the accuracy of the sensing of the actual torque Tr.

Furthermore, as shown in FIG. 1, the electric vehicle 10 includes an anti-vibration processing section 400 and an anti-loosening processing section 402 in the ECU 60.

Figure 4:
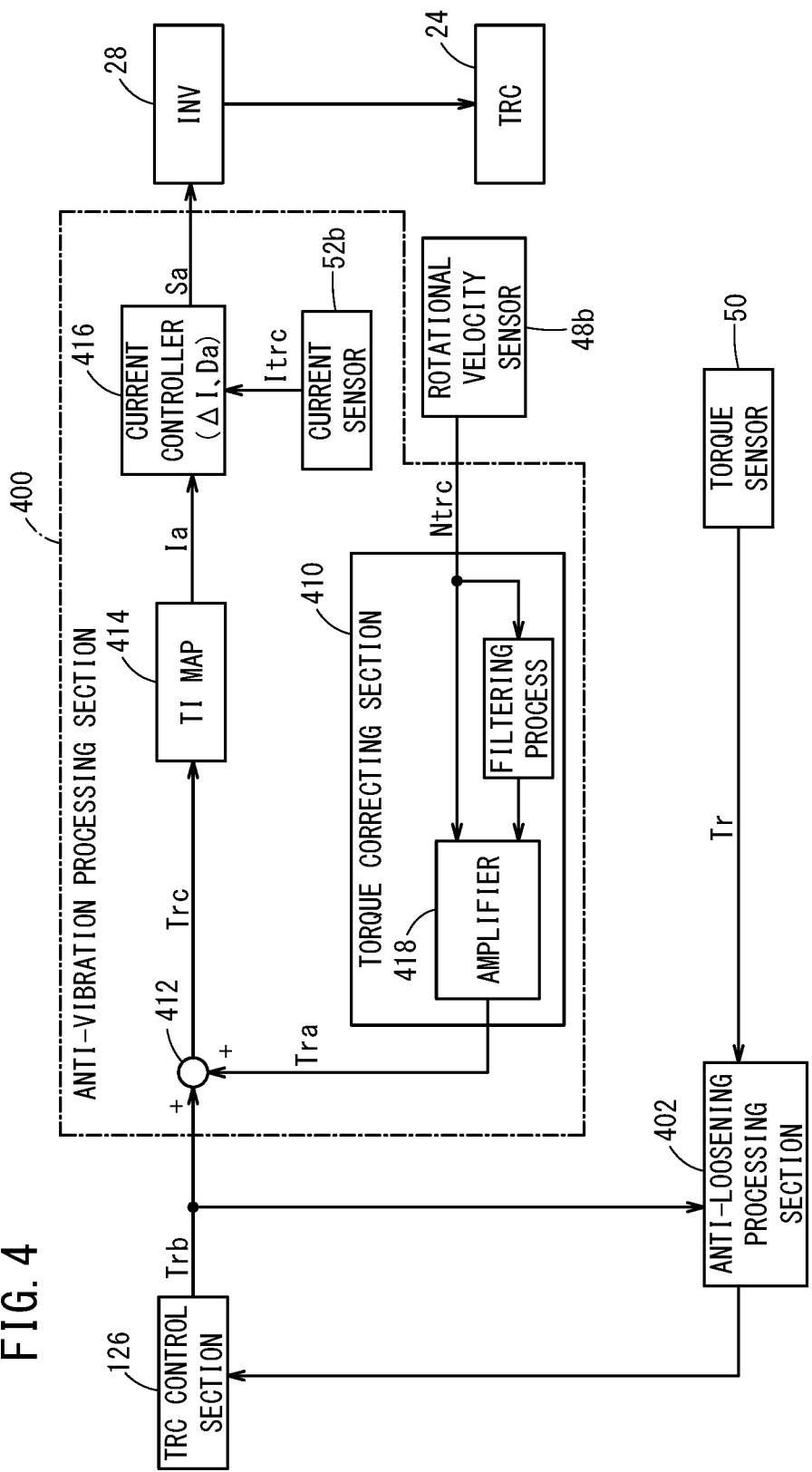
FIG. 4 is a block diagram of a schematic configuration of the anti-vibration processing section and the anti-looseness processing section.

As shown in FIG. 4, the anti-vibration processing section 400 includes a torque correcting section 410, an adder 412, a torque-current conversion map 414, and a current controller 416.

The torque correcting section 410 generates a torque correction value Tra by multiplying a difference between a signal Sa (actual rotational velocity Ntrc) from the rotational velocity sensor 48b and a signal Sb obtained by smoothing the signal Sa with a filtering process by a gain coefficient corresponding to the vehicle state (acceleration or deceleration, cruise, automatic parking operation, and the like) used by an amplifier 418 (e.g., a P-controller).

The adder 412 adds the torque correction value Tra from the torque correcting section 410 to a torque command value Trb from the TRC control section 126, to generate the final torque command value Trc.

The torque-current conversion map 414 stores in advance the relationship between the final torque command value Trc and the target current Ia. The torque-current conversion map 414 supplies the current controller 416 with the target current Ia corresponding to the final torque command value Trc from the adder 412. The current controller 416 calculates the difference ΔI between the actual current Itrc from the current sensor 52b and the target current Ia from the torque-current conversion map 414. Furthermore, the current controller 416 calculates a target duty ratio Da corresponding to the difference ΔI, and outputs the drive signal Sa corresponding to this target duty ratio Da to the second inverter 28.

The second inverter 28 turns ON a switching element (not shown in the drawings) inside the second inverter 28 in response to the drive signal Sa, and supplies the current from the high voltage battery 38 (see FIG. 1) to the second rotating electric machine 24 (TRC).

Figure 5A:
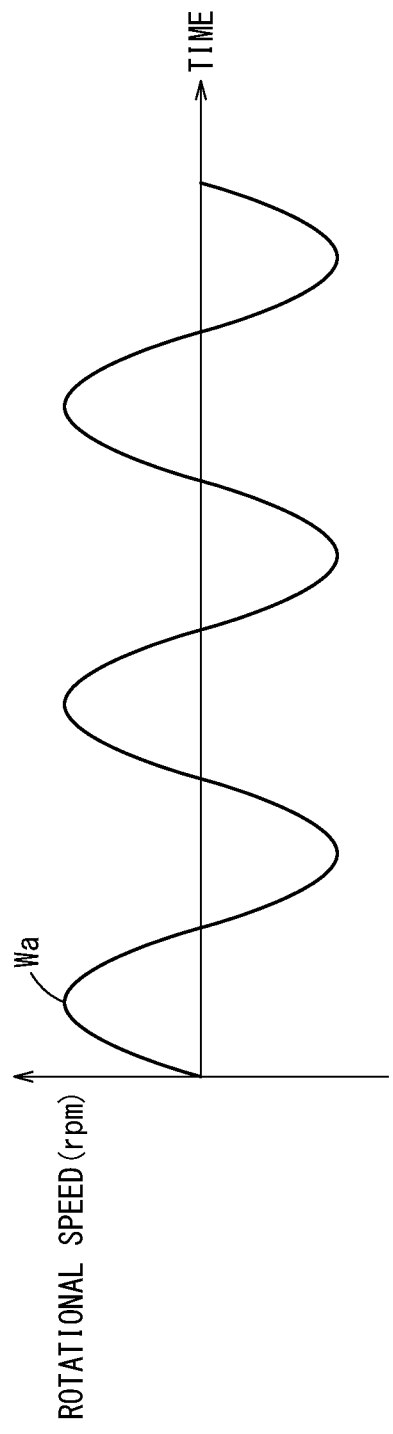
FIG. 5A is a chart showing a vibrational waveform of the traction motor (drive motor) extracted from periodic fluctuation of the rotational velocity sensor.
Figure 5B:
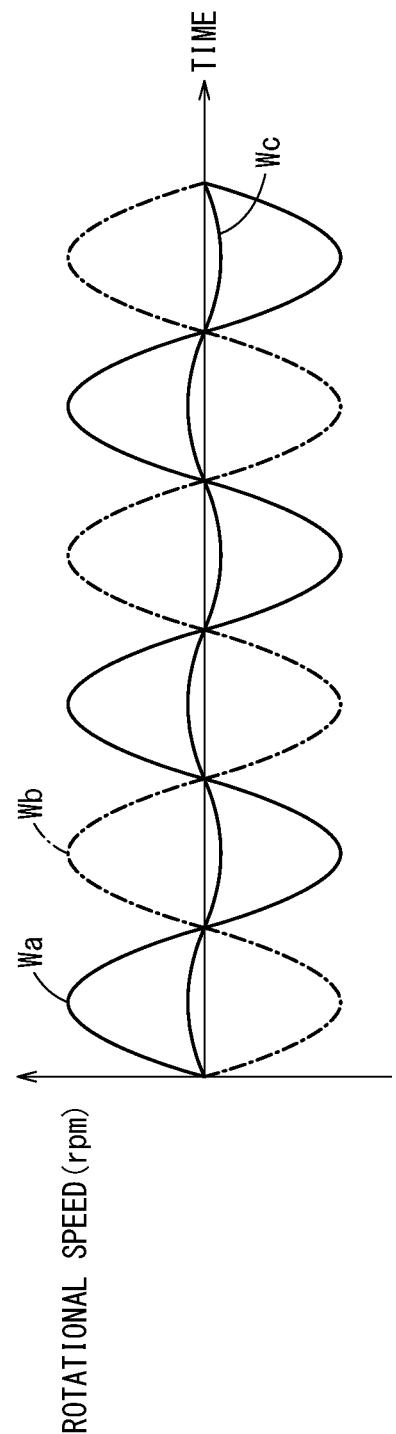
FIG. 5B is a chart showing a waveform obtained by combining the vibrational waveform of the traction motor with a waveform having the reverse phase of this vibrational waveform.

As shown in FIG. 5A, the vibrational wave Wa (see the solid line) of the traction motor 24 extracted from the periodic fluctuation of the rotational velocity sensor 48b has a resonance waveform. Therefore, by correcting the torque command value Trb from the TRC control section 126 using the anti-vibration processing section 400 described above, an effect equivalent to inputting, to the vibrational waveform Wa of the traction motor 24, the waveform Wb (see the single-dot chain line) that has the reverse phase of the vibrational wave Wa is achieved, as shown in FIG. 5B, and the corrected vibrational waveform Wc becomes very close to zero.

On the other hand, in a case where the motor output of the traction motor 24 is a prescribed output and the output of the torque sensor 50 is at a minimum, the anti-loosening processing section 402 lowers the torque command value Trb from the TRC control section 126, to lower the motor output of the traction motor 24. For example, if the output of the torque sensor 50 is at a minimum despite the torque command value Trb from the TRC control section 126 being greater than or equal to a prescribed value, the motor output is lowered.

Figure 6A:
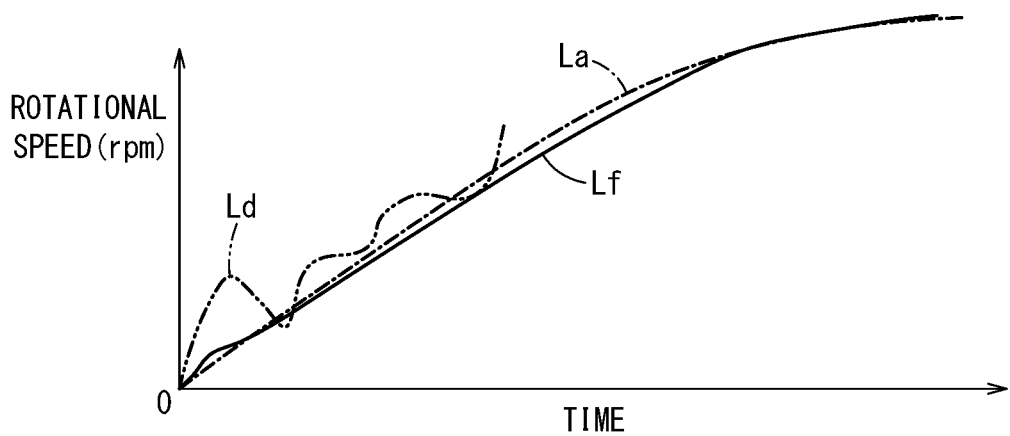
FIG. 6A is a chart showing change in the target rotational speed of the traction motor, change in the rotational speed caused by the loose element of the spline joint, and change in the rotational speed caused by the anti-looseness processing section.
Figure 6B:
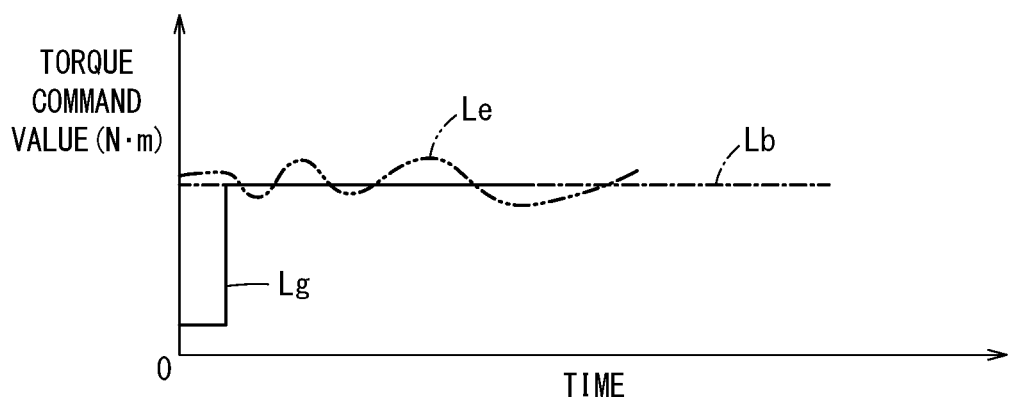
FIG. 6B is a chart showing change in the target torque command value, change in the torque command value caused by the loose element of the spline joint, and change in the torque command value caused by the anti-looseness processing section.
Figure 6C:
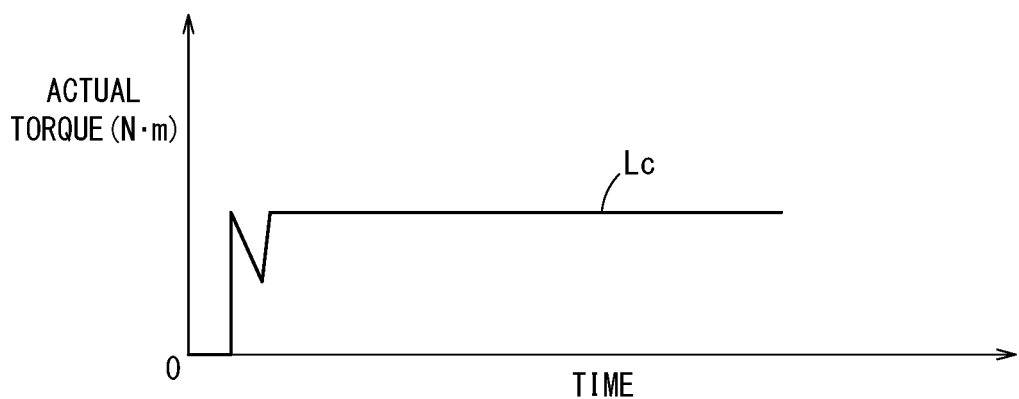
FIG. 6C is a chart showing change in the actual torque from the torque sensor.

Usually, as shown by the single-dot chain line La of FIG. 6A, the vehicle 10 is designed such that a target rotational speed of the traction motor 24 is increased gradually and smoothly over time. In order to realize this, as shown by the single-dot chain line Lb of FIG. 6B, a target torque command value is set for the target rotational speed. In FIG. 6B, an example is shown in which a constant torque command value is used as the target torque command value.

When the vehicle 10 begins moving, for example, the rotor shaft 310 rotates but the rotational force of the rotor shaft 310 is barely transmitted to the output shaft 312 due to the looseness (gap or backlash) caused by the spline joint 314, as described above. In this case, as shown by the solid line Lc of FIG. 6C, the actual torque Tr from the torque sensor 50 (the torque value from the torque sensor) is almost zero.

After this, when the gap of the spline joint 314 is diminished resulting in no gap and the rotational force of the rotor shaft 310 is transmitted to the output shaft 312, the output shaft 312 rotates suddenly, and this shock causes the trajectory of the rotational speed of the motor to be significantly skewed or deviated from the target rotational speed (see the single-dot chain line La), as shown by the double-dot chain line Ld of FIG. 6A, and also causes the trajectory of the torque command value Trb to be significantly skewed or deviated from the target rotational speed (see the single-dot chain line Lb), as shown by the double-dot chain line Le of FIG. 6B. Due to this, there are cases where vibrations and abnormal sounds (noises) are propagated to the outside of the traction motor 24.

Therefore, when the vehicle 10 begins to move, for example, if the motor output of the traction motor 24 is a prescribed output, i.e., if the torque command value Trb from the TRC control section 126 is greater than or equal to a prescribed value, and the output of the torque sensor 50 is at a minimum (almost zero), the anti-loosening processing section 402 lowers the torque command value Trb from the TRC control section 126 to thereby lower the motor output of the traction motor 24. In other words, the anti-loosening processing section 402 causes the TRC control section 126 to output a torque command value Trb for diminishing and eliminating the gap (filling the gap) of the spline joint 314.

Therefore, after this, even though the gap of the spline joint 314 is eliminated and the rotational force of the rotor shaft 310 is transmitted to the output shaft 312, the output shaft 312 does not rotate suddenly because the motor output has been lowered, and the trajectory of the rotational speed of the motor approximately follows the target rotational speed (see the single-dot chain line La) as shown by the solid line Lf of FIG. 6A, and the trajectory of the torque command value Trb approximately follows the target torque command value (see the single-dot chain line Lb) as shown by the solid line Lg of FIG. 6B.

Figure 7:
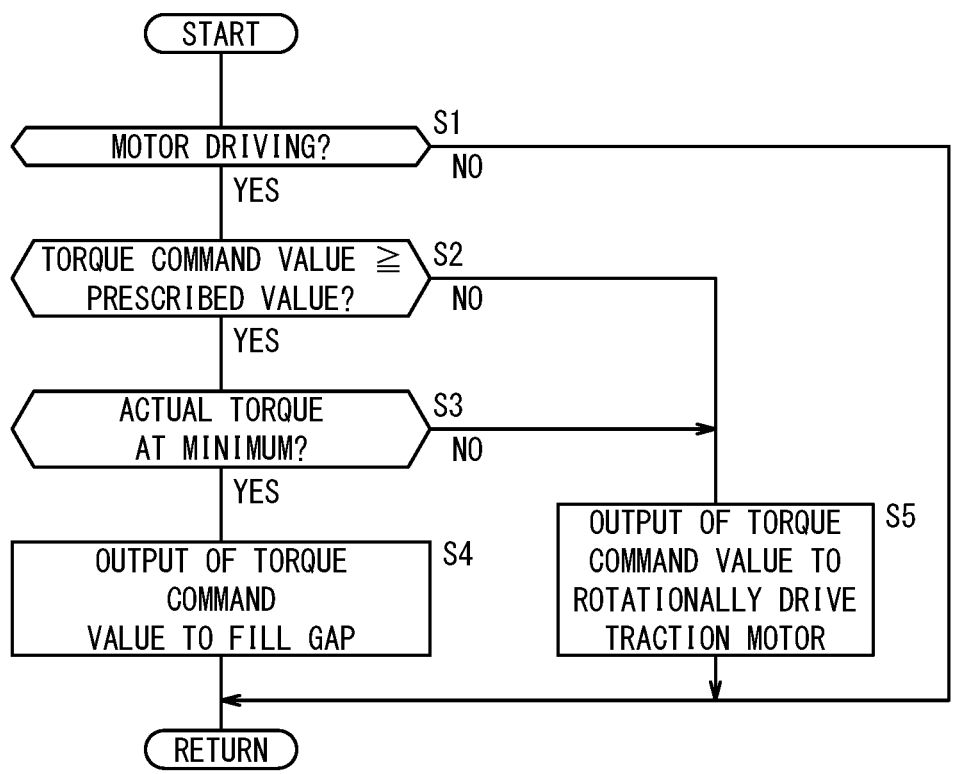
FIG. 7 is a flow chart showing the processing operations of the drive motor and the electric vehicle according to the present embodiment.

The following describes the processing operations of the electric vehicle 10 and the drive motor 100 according to the present embodiment, while referencing FIG. 7.

First, at step S1 of FIG. 7, the ECU 60 determines whether the travel drive source is motor driving. If it is motor driving (step S1: YES), the process proceeds to step S2, and the anti-loosening processing section 402 determines whether the torque command value Trb is greater than or equal to a prescribed value. The prescribed value can be a command value output from the TRC control section 126 when the vehicle 10 begins moving, a command value output from the TRC control section 126 during sudden acceleration by the motor driving, a command value output from the TRC control section 126 when switching from engine driving to motor driving, or the like, for example.

If the torque command value Trb is greater than or equal to the prescribed value (step S2: YES), the process proceeds to step S3, and the anti-loosening processing section 402 determines whether the actual torque Tr from the torque sensor 50 is at a minimum (nearly zero). If the actual torque Tr is at a minimum (step S3: YES), the process proceeds to step S4, and the anti-loosening processing section 402 issues instructions to lower the torque command value Trb to the TRC control section 126. The TRC control section 126 lowers the torque command value Trb, based on the instructions from the anti-loosening processing section 402. Specifically, the TRC control section 126 outputs a torque command value for diminishing and eliminating the gap (filling the gap). Due to this, the motor output of the traction motor 24 is lowered.

If it is determined in step S2 described above that the torque command value Trb is less than the prescribed value (step S2: NO), or if it is determined in step S3 that the actual torque Tr from the torque sensor 50 is not at a minimum (step S3: NO), the process proceeds to step S5, and the torque command value Trb is output without being lowered. In other words, the TRC control section 126 outputs a torque command value for rotationally driving the traction motor 24.

When the process of step S4 or the process of step S5 is finished, or if it is determined in step S1 above that motor driving is not being performed (step S1: NO), the processes of step S1 and onward are repeated after a prescribed time has passed.

<A-3. Effect of the Present Embodiment>

In this way, the drive motor 100 of the present embodiment is a drive motor 100 in which a torque sensor 50 is arranged on an outer circumference of a shaft. The drive motor includes a rotor 300, a rotor shaft 310 arranged inside the rotor 300, and an output shaft 312 that is joined to the rotor shaft 310 by a joint 314 having a loose element and is configured to transmit rotational force of the rotor shaft 310 to an output side, wherein the torque sensor 50 is arranged on an output side of the joint 314 in a range not overlapping with the joint 314.

Examples of the joint having a loose element include the spline joint 314, a coupling joint, or the like, but are not limited to these examples, and any other joint structures can be favorably used as long as it is a joint with a loose element.

By arranging the torque sensor 50 on the output side of the joint 314, it is possible to detect the looseness (gap) caused by the joint 314. Therefore, by reflecting this detected gap portion caused by the joint 314 in the motor output, it is possible to make the rotation on the output side smooth.

The present embodiment further includes a third bearing 330c configured to rotationally support the output shaft 312, and the torque sensor 50 is arranged closer to the output side than the third bearing 330c.

Since the rotor 300, the third bearing 330c, and the torque sensor 50 are arranged in the stated order from the rotor 300 toward the output side, the third bearing 330c functions as a magnetic shield for the alternating magnetism from the rotor 300 and the like. In this way, it is possible to restrict the generation of noise by alternating magnetic fields and the like.

The present embodiment further includes a rotational velocity sensor 48b configured to detect the rotational velocity of the rotor 300, the rotational velocity sensor 48b is arranged on one end side of the rotor 300 that is not a torque transmission path, and the torque sensor 50 is arranged on another end side of the rotor 300 that is the torque transmission path.

By arranging the rotational velocity sensor 48b (rotation number sensor) at the one end side of the rotor 300, the rotational velocity sensor 48b is less affected by the torque transmitted in accordance with the rotation of the rotor 300, and it is possible to accurately detect the rotational velocity (number of rotations) of the rotor 300. Furthermore, by providing the torque sensor 50 at the other end side of the rotor 300, the torque sensor 50 is less affected by noise from the rotational velocity sensor 48b (rotation number sensor), and it is possible to improve the torque detection accuracy.

Even if the rotational velocity sensor 48b loses functionality due to an impact or the like, it is possible implement rotational control of the rotor 300 based on the torque sensed by the torque sensor 50. For example, by performing feedback control on the TRC control section 126 by using the difference between the torque command value Trb from the TRC control section 126 that controls the rotor 300 and the actual torque Tr detected by the torque sensor 50, it is possible to implement rotational control of the rotor 300. In other words, rotational control using the torque sensor 50 can be made to function as a failsafe until the damaged rotational velocity sensor 48b is replaced with a normal rotational velocity sensor 48b.

The present invention further includes the TRC control section 126 configured to control the motor output based on the output of the torque sensor 50, and the TRC control section 126 lowers the motor output when the motor output is a prescribed output and the output of the torque sensor 50 is at a minimum.

There are cases where torque loss occurs when the vehicle begins moving or when the vehicle velocity V is suddenly increased. Torque loss is a state in which the rotor shaft 310 rotates but the rotational force of the rotor shaft 310 is barely transmitted to the output shaft 312, due to the looseness (gap or backlash) caused by the spline joint 314. In other words, even though the rotor shaft 310 is rotating according to the motor output, the output shaft 312 is barely rotating. In such a case, when the gap is filled and the rotational force of the rotor shaft 310 is transmitted to the output shaft 312, there are cases where the output shaft 312 rotates suddenly and the resulting shock is transmitted to the outside as vibration and noise. When the drive motor 100 is used as the drive motor for an electric vehicle, there are cases where this shock causes a sense of discomfort in the driver.

Therefore, the TRC control section 126 lowers the motor output when the output of the torque sensor 50 is at a minimum. Due to this, at the time when the rotor shaft 310 and the output shaft 312 are joined, i.e., at the time when the gap is filled, it is possible to weaken the shock and to suppress the transmission of vibrations and noises to the outside.

Furthermore, the vehicle 10 according to the present embodiment includes the drive motor 100 described above. By arranging the torque sensor 50 closer to the output side than the joint 314, it is possible to detect the looseness (gap) caused by the joint 314. Therefore, by reflecting the detected loose component caused by the joint 314 in the motor output, it is possible to smooth the rotation on the output side. As a result, it is possible to suppress the propagation of vibrations and noises to the outside, and to reduce the sense of discomfort felt by the driver.

B. Modifications

The present invention is not limited to the embodiments described above, and it is obvious that various configurations can be adopted based on the content recorded in this Specification. For example, the configuration described below can be adopted.

<B-1. Applicable Target>

The vehicle 10 according to the present embodiment is configured to transmit drive force from the second rotating electric machine 24 to the wheel output shaft 208, but may selectively adopt a configuration to transmit drive force from the first rotating electric machine 22 to the wheel output shaft 208. In this case, the torque command value issued to the first rotating electric machine 22 from the GEN control section 124 may be corrected.

<B-2. Rotating Electric Machines>

The first rotating electric machine 22 and the second rotating electric machine 24 of the present embodiment are each three-phase AC brushless types. However, from the viewpoint of correcting the torque command value for the first rotating electric machine 22 or the second rotating electric machine 24, the rotating electric machines are not limited to these types. The first rotating electric machine 22 and the second rotating electric machine 24 may be DC (direct current) types or brush types.

The first rotating electric machine 22 and the second rotating electric machine 24 of the present embodiment are each an interior permanent magnet synchronous motor (IPMSM). However, from the viewpoint of correcting the torque command value for the first rotating electric machine 22 or the second rotating electric machine 24, for example, the rotating electric machines are not limited to these types. The first rotating electric machine 22 and the second rotating electric machine 24 may be other types of rotating electric machines.

<B-3. Clutches>

In the present embodiment, the first to third clutches 30, 32, and 34 are provided (see FIG. 1). However, from the viewpoint of correcting the torque command value for the first rotating electric machine 22 or the second rotating electric machine 24, for example, the present invention is not limited to this. As an example, the second clutch 32 or the third clutch 34 can be omitted.

What is claimed is:

1. A drive motor in which a magnetostrictive torque sensor is arranged on an outer circumference of a shaft, the drive motor comprising:
    a rotor;
    a rotor shaft arranged within the rotor; and
    an output shaft that is joined to the rotor shaft by a joint having a loose element, and is configured to transmit rotational force of the rotor shaft to an output side, wherein
    the magnetostrictive torque sensor is arranged on an output side of the joint, in a range not overlapping with the joint.

2. The drive motor according to claim 1, further comprising:
    a bearing configured to rotationally support the output shaft, wherein
    the magnetostrictive torque sensor is arranged closer to the output side than the bearing.

3. The drive motor according to claim 2, further comprising:
    a rotational velocity sensor configured to detect rotational velocity of the rotor, wherein
    the rotational velocity sensor is arranged on one end side of the rotor that is not a torque transmission path, and
    the magnetostrictive torque sensor is arranged on another end side of the rotor that is the torque transmission path.

4. The drive motor according to claim 3, further comprising:
    a control section configured to control motor output based on output of the magnetostrictive torque sensor, wherein
    the control section lowers the motor output when the motor output is a prescribed output and output of the magnetostrictive torque sensor is at a minimum.

5. The drive motor according to claim 2, further comprising:
    a control section configured to control motor output based on output of the magnetostrictive torque sensor, wherein
    the control section lowers the motor output when the motor output is a prescribed output and output of the magnetostrictive torque sensor is at a minimum.

6. The drive motor according to claim 1, further comprising:
    a rotational velocity sensor configured to detect rotational velocity of the rotor, wherein
    the rotational velocity sensor is arranged at one end side of the rotor that is not a torque transmission path, and
    the magnetostrictive torque sensor is arranged at another end side of the rotor that is the torque transmission path.

7. The drive motor according to claim 6, further comprising:
    a control section configured to control motor output based on output of the magnetostrictive torque sensor, wherein
    the control section lowers the motor output when the motor output is a prescribed output and output of the magnetostrictive torque sensor is at a minimum.

8. The drive motor according to claim 1, further comprising:
    a control section configured to control motor output based on output of the magnetostrictive torque sensor, wherein
    the control section lowers the motor output when the motor output is a prescribed output and output of the magnetostrictive torque sensor is at a minimum.

9. An electric vehicle comprising a drive motor, wherein the drive motor in which a magnetostrictive torque sensor is arranged on an outer circumference of a shaft, includes:
    a rotor;
    a rotor shaft arranged within the rotor; and
    an output shaft that is joined to the rotor shaft by a joint having a loose element, and is configured to transmit rotational force of the rotor shaft to an output side, and
    the magnetostrictive torque sensor is arranged on an output side of the joint, in a range not overlapping with the joint.

10. A control method of a drive motor, wherein the drive motor in which a magnetostrictive torque sensor is arranged on an outer circumference of a shaft, includes:
    a rotor;
    a rotor shaft arranged within the rotor; and
    an output shaft that is joined to the rotor shaft by a joint having a loose element, and is configured to transmit rotational force of the rotor shaft to an output side, and
    the magnetostrictive torque sensor is arranged on an output side of the joint, in a range not overlapping with the joint,
    the control method of the drive motor, comprising:
    a step of determining whether a torque command value from a motor control section configured to control the drive motor is greater than or equal to a prescribed value;
    a step of determining whether actual torque from the torque sensor is at a minimum, if the torque command value is greater than or equal to the prescribed value; and
    a step of lowering the torque command value if the actual torque is at the minimum.

11. A control method of a drive motor, wherein the drive motor in which a magnetostrictive torque sensor is arranged on an outer circumference of a shaft, includes:
    a rotor;
    a rotor shaft arranged within the rotor; and
    an output shaft that is joined to the rotor shaft by a joint having a loose element, and is configured to transmit rotational force of the rotor shaft to an output side, and
    the magnetostrictive torque sensor is arranged on an output side of the joint, in a range not overlapping with the joint, the control method of the drive motor comprising:
a step of determining whether a torque command value from a motor control section configured to control the drive motor is greater than or equal to a prescribed value;
a step of determining whether actual torque from the torque sensor is at a minimum; and
a step of outputting the torque command value without lowering the torque command value, if the torque command value is less than the prescribed value or if it is determined that the actual torque from the torque sensor is not at the minimum.

* * * * *